(12) United States Patent
Palanki et al.

(10) Patent No.: US 9,125,163 B2
(45) Date of Patent: Sep. 1, 2015

(54) PERSISTENT INTERFERENCE MITIGATION IN A WIRELESS COMMUNICATION

(75) Inventors: Ravi Palanki, San Diego, CA (US); Aamod Khandekar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 983 days.

(21) Appl. No.: 12/262,576

(22) Filed: Oct. 31, 2008

(65) Prior Publication Data

US 2009/0130980 A1    May 21, 2009

Related U.S. Application Data

(60) Provisional application No. 60/988,693, filed on Nov. 16, 2007.

(51) Int. Cl.
*H04B 1/00* (2006.01)
*H04W 52/32* (2009.01)
*H04W 52/24* (2009.01)
*H04W 72/08* (2009.01)
(Continued)

(52) U.S. Cl.
CPC .......... *H04W 52/325* (2013.01); *H04W 52/241* (2013.01); *H04W 72/08* (2013.01); *H04B 7/0617* (2013.01); *H04W 72/046* (2013.01); *H04W 72/0426* (2013.01); *Y02B 60/50* (2013.01)

(58) Field of Classification Search
None
See application file for complete search history.

(56) References Cited

U.S. PATENT DOCUMENTS 7,016,421 B2      3/2006   Yap et al.
2002/0164989 A1 * 11/2002  Skillermark et al. ......... 455/446
2003/0181213 A1 *  9/2003  Sugar et al. .................. 455/454
(Continued)

FOREIGN PATENT DOCUMENTS

JP    2003530009    10/2003
JP    2006135673 A   5/2006
(Continued)

OTHER PUBLICATIONS

"3GPP TR 25.814 V1.5.0; 3rd Generation Partnership Project; Technical Specification Group Radio Access Network; Physical Layer Aspects for Evolved UTRA (Release 7)" Internet Citation May 27, 2006, pp. 1-125, XP002574055.
(Continued)

*Primary Examiner* — Zhiyu Lu
(74) *Attorney, Agent, or Firm* — Fariba Yadegar-Bandari

(57) ABSTRACT

Techniques for transmitting data with persistent interference mitigation in a wireless communication system are described. A station (e.g., a base station or a terminal) may observe high interference and may send a request to reduce interference to interfering stations. The request may be valid for a time period covering multiple response periods. Each interfering station may grant or dismiss the request in each response period, may dismiss the request by transmitting at full power, and may grant the request by transmitting at lower than full power. The station may receive a response from each interfering station indicating grant or dismissal of the request by that interfering station in each response period. The station may estimate SINR based on the response received from each interfering station and may exchange data with another station based on the estimated SINR. Persistent interference mitigation may reduce signaling overhead and improve resource utilization and performance.

40 Claims, 10 Drawing Sheets

(51) Int. Cl.
*H04B 7/06* (2006.01)
*H04W 72/04* (2009.01)

(56) References Cited

U.S. PATENT DOCUMENTS

| | | | |
|---|---|---|---|
| 2005/0002324 | A1 | 1/2005 | Sutivong et al. |
| 2005/0226222 | A1* | 10/2005 | Qian .............................. 370/352 |
| 2006/0111137 | A1 | 5/2006 | Mori et al. |
| 2006/0165036 | A1* | 7/2006 | Chandra et al. ............... 370/329 |
| 2006/0209721 | A1 | 9/2006 | Mese et al. |
| 2007/0025383 | A1* | 2/2007 | Katar et al. ................... 370/442 |
| 2007/0217369 | A1* | 9/2007 | Garrett et al. ................. 370/336 |
| 2008/0075033 | A1* | 3/2008 | Shattil ........................... 370/328 |
| 2008/0085720 | A1* | 4/2008 | Hirano et al. ............... 455/452.1 |

FOREIGN PATENT DOCUMENTS

| | | |
|---|---|---|
| JP | 2007013542 A | 1/2007 |
| JP | 2009506652 A | 2/2009 |
| JP | 2010539796 A | 12/2010 |
| RU | 2005138861 | 6/2006 |
| WO | WO2004019622 | 3/2004 |
| WO | WO2004104530 | 12/2004 |
| WO | WO2006087797 A1 | 8/2006 |
| WO | 2006099547 A1 | 9/2006 |
| WO | WO2006099548 | 9/2006 |
| WO | 2007024895 A2 | 3/2007 |

OTHER PUBLICATIONS

"3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Interdigital Communications Corporation: "R1-063465—Combined Open Loop/Closed Loop Uplink Power Control with Interference Mitigation for E-UTRA" SGPP Draft, 3rd Generation Partnership Project (SGPP), Mobile Competence Centre, Nov. 1, 2006, XP050103902 Sophiaantipolis Cedex ; France p. 1, lines 32,33 p. 2, lines 1-23 p. 3, lines 3-10 p. 4, lines 22-25 Equations 1 and 2.
International Search Report and Written Opinion—PCT/US2008/083047, International Search Authority—European Patent Office—Apr. 9, 2009.
Motorola: "R1-074598—Persistent Scheduling of CQI/PMI PUCCH Resources" 3GPP Draft; 3rd Generation Partnership Project (SGPP), Mobile Competence Centre, Oct. 30, 2007, XP050108085 Sophia-Antipolis Cedex ; France p. 1, line 20 p. 2, lines 1-3,10,11.
Taiwan Search Report—TW097144252—TIPO—Mar. 29, 2012.
3GPP TR 25.814 V1.2.0, 3rd Generation Partnership Project, Technical Specification Group Radio Access Network, Physical Layer Aspects for Evolved UTRA (Release 7), Internet Citation, Feb. 1, 2006, XP002400401, Retrieved from the Internet: URL: http://www.3gpp.org/ftp/Specs/html-info/25814.htm [retrieved on Sep. 26, 2006].
Taiwan Search Report—TW097144252—TIPO—Oct. 29, 2014.

* cited by examiner

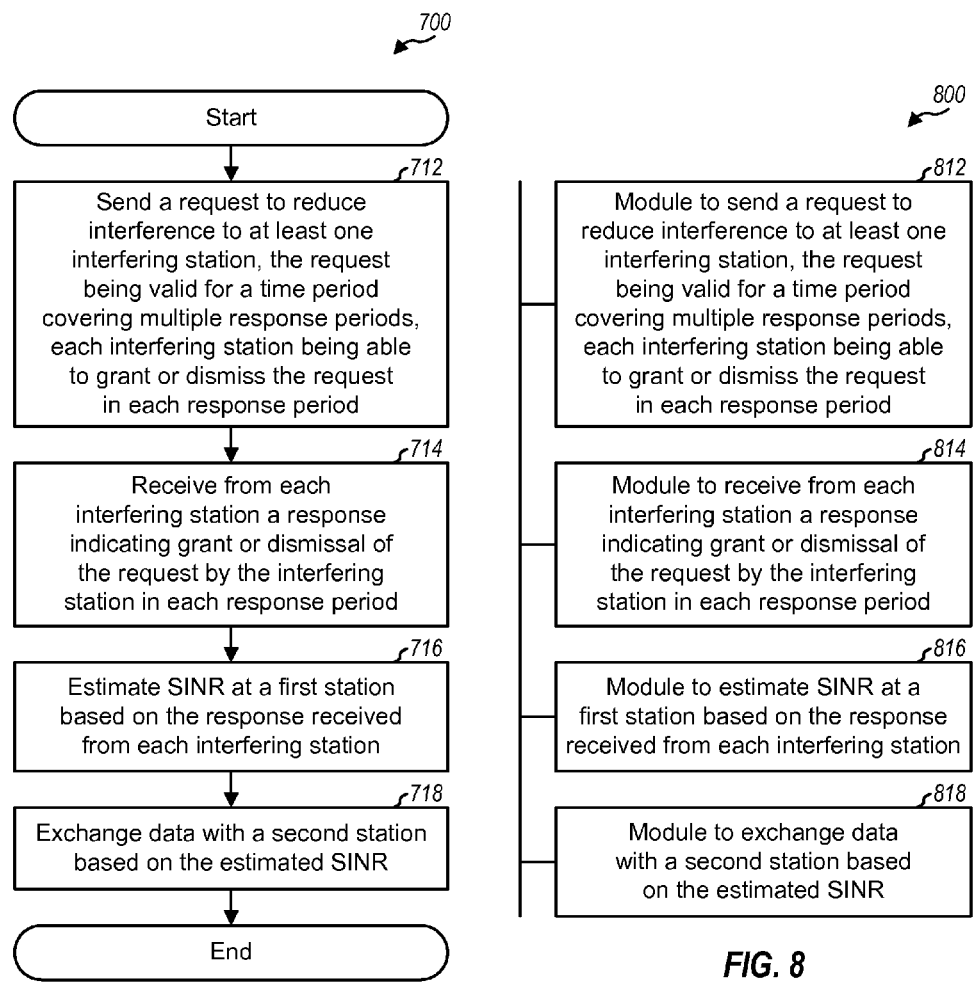

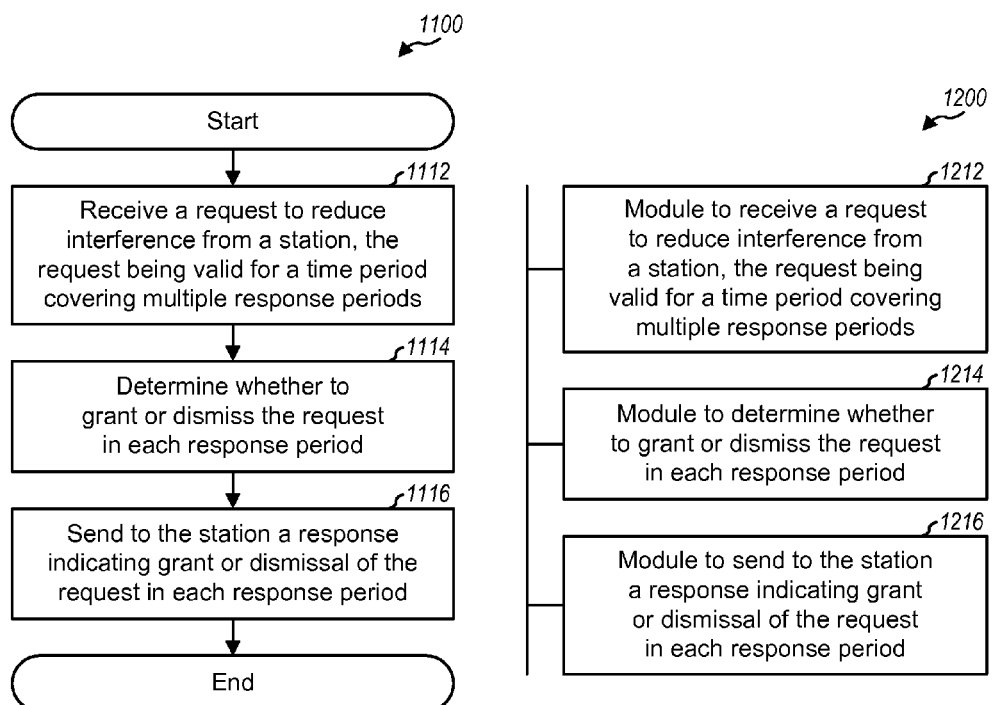

PERSISTENT INTERFERENCE MITIGATION IN A WIRELESS COMMUNICATION

The present application claims priority to provisional U.S. Application Ser. No. 60/988,693, entitled "PERSISTENT AVOIDANCE MECHANISMS IN WIRELESS COMMUNICATION SYSTEMS," filed Nov. 16, 2007, assigned to the assignee hereof and incorporated herein by reference.

BACKGROUND

I. Field

The present disclosure relates generally to communication, and more specifically to data transmission techniques for a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of terminals. A terminal may communicate with a base station via the forward and reverse links. The forward link (or downlink) refers to the communication link from the base station to the terminal, and the reverse link (or uplink) refers to the communication link from the terminal to the base station.

A base station may transmit data to one or more terminals on the forward link and may receive data from one or more terminals on the reverse link. On the forward link, data transmission from the base station may observe interference due to data transmissions from neighbor base stations. On the reverse link, data transmission from each terminal may observe interference due to data transmissions from other terminals communicating with the neighbor base stations. For both the forward and reverse links, the interference due to interfering base stations and interfering terminals may degrade performance.

There is therefore a need in the art for techniques to mitigate interference in order to improve performance.

SUMMARY

Techniques for transmitting data with persistent interference mitigation in a wireless communication system are described herein. For persistent interference mitigation, a station observing high interference may send a request to reduce interference to interfering stations. The request may be valid for a time period covering multiple response periods. Each response period may cover one or more frames in which data may be sent. Each interfering station may either grant or dismiss the request in each response period depending on various factors described below. Persistent interference mitigation may (i) reduce signaling overhead since the request may be sent just once and (ii) improve resource utilization since each interfering station can either grant or deny the request for individual response periods instead of the entire persistent time period. The techniques may be used for communication between a base station and a terminal and also for peer-to-peer communication between terminals.

In one design, a given station A may send a request to reduce interference to at least one interfering station. Station A may be a serving base station and may send the request to reduce interference in response to receiving a resource request from a terminal. Alternatively, station A may be a terminal and may send the request to reduce interference in response to receiving an interference mitigation trigger from a serving base station. In any case, the request may cover a persistent time period spanning multiple response periods, and each interfering station may grant or dismiss the request in each response period. An interfering station may dismiss the request by transmitting at full power and may grant the request by transmitting at lower than full power and/or at a different beam direction.

Station A may receive a response from each interfering station indicating grant or dismissal of the request by that interfering station in each response period. In one design, station A may receive at least one pilot from each interfering station during the persistent time period. Each pilot may be transmitted at a power level and/or a beam direction determined based on the grant or dismissal of the request by the interfering station for at least one response period. Station A may estimate signal-to-noise-and-interference ratio (SINR) based on the at least one pilot received from each interfering station. The SINR may be better due to interference mitigation. Station A may exchange (e.g., send or receive) data with another station B based on the estimated SINR.

Various aspects and features of the disclosure are described in further detail below.

BRIEF DESCRIPTION OF THE DRAWINGS

FIG. 7 shows a process for sending a reduce interference request.

FIG. 8 shows an apparatus for sending a reduce interference request.

FIG. 11 shows a process for receiving a reduce interference request.

FIG. 12 shows an apparatus for receiving a reduce interference request.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
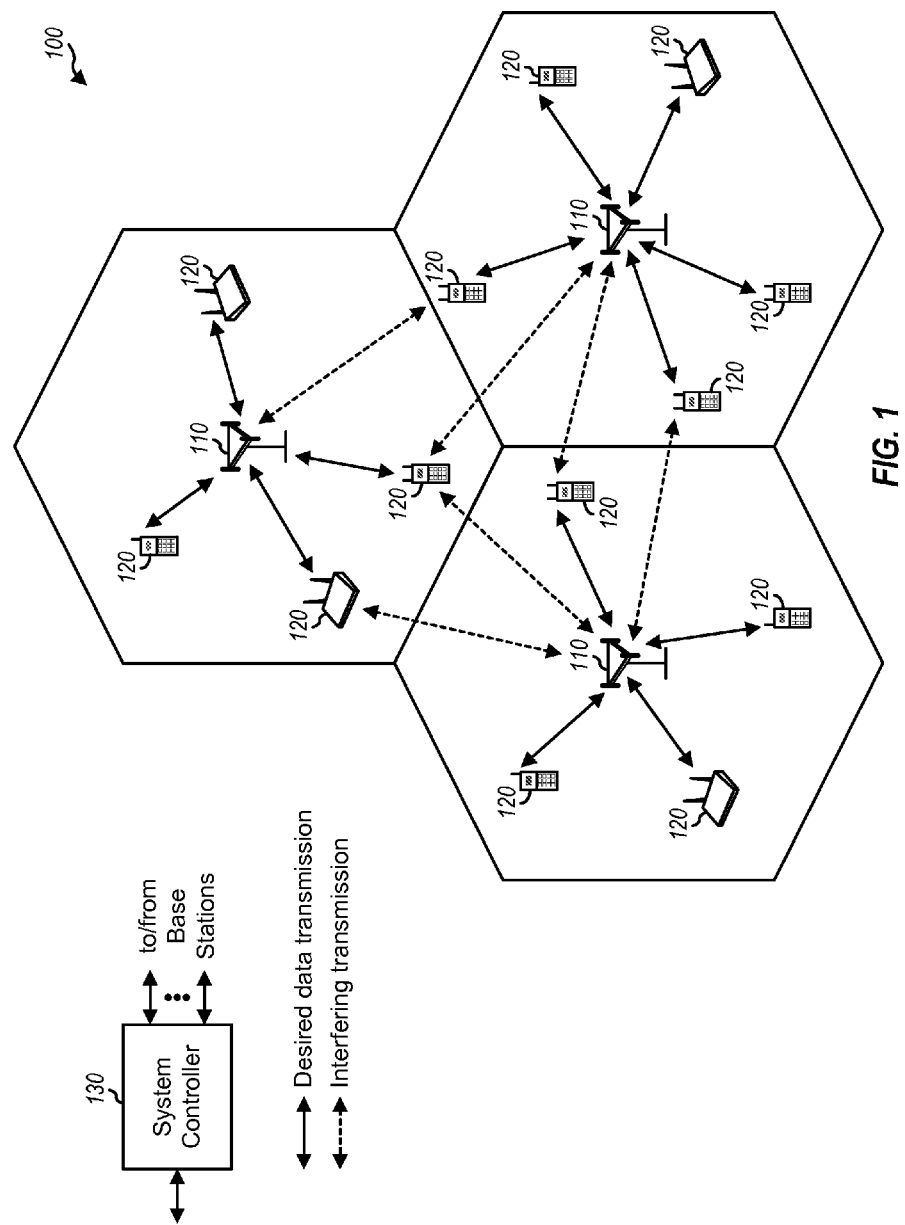
FIG. 1 shows a wireless communication system.

FIG. 1 shows a wireless communication system 100, which may include a number of base stations 110 and other network entities. System 100 may be (i) a synchronous system in which the base stations have common timing or (ii) an asynchronous system in which the base stations can have different timing. A base station may be a fixed station that communicates with the terminals and may also be referred to as an access point, a Node B, an evolved Node B, etc. Each base station 110 may provide communication coverage for a particular geographic area. The term "cell" can refer to a coverage area of a base station and/or a base station subsystem serving this coverage area, depending on the context in which the term is used. A base station may provide communication coverage for a macro cell, a pico cell, a femto cell, and/or other types of cell. A macro cell may cover a relatively large geographic area (e.g., several kilometers in radius) and may support communication for all terminals with service subscription in the system. A pico cell may cover a relatively small geographic area and may support communication for all terminals with service subscription. A femto cell may cover a relatively small geographic area (e.g., a home) and may support communication for a set of terminals having association with the femto cell, e.g., terminals belonging to a closed subscriber group (CSG). The techniques described herein may be used for all types of cell.

A system controller 130 may couple to a set of base stations and provide coordination and control for these base stations. System controller 130 may be a single network entity or a collection of network entities. System controller 130 may communicate with the base stations via a backhaul, which is not shown in FIG. 1 for simplicity.

Terminals 120 may be dispersed throughout the system, and each terminal may be stationary or mobile. A terminal may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. In FIG. 1, a solid line with double arrows indicates desired data transmission between a terminal and a serving base station, which is a base station designated to serve the terminal on the forward and/or reverse link. A dashed line with double arrows indicates interfering transmission between a terminal and a base station. In the description herein, a station may be a base station or a terminal.

A terminal may communicate with a serving base station on the forward and/or reverse link. On the forward link, the terminal may observe high interference from an interfering base station. This may be the case, for example, if the serving base station covers a pico cell or a femto cell and has much lower transmit power than the interfering base station. On the reverse link, the serving base station may observe high interference from an interfering terminal. The interference on each link may degrade performance of data transmission on that link.

For example, a transmitter station A may send data transmission to a receiver station B, which may observe high interference from another transmitter station X. To combat the interference, station A may send the data transmission at sufficiently high transmit power in order for station B to recover the data transmission with a target probability of error or lower. However, transmit power adjustment alone may not work in certain scenarios. For example, the interference from station X and/or other transmitter stations may be significantly higher than the received power from station A. In this case, the SINR at receiver station B may be very low, and transmitter station A may not have sufficient transmit power to overcome the interference at station B. Furthermore, even if it is possible to overcome the interference, a high-powered data transmission from station A may cause excessive interference to other stations and may thus be undesirable.

High interference levels may be common in wireless technologies where deployments may be unplanned, e.g., femto cell deployments, home base station deployments, etc. Interference may be especially severe in systems with restricted association, where terminals may not be allowed to connect to base stations with the strongest link. For example, a terminal may not be able to connect to a neighbor's home base station even if the signal strength from this base station is significantly higher than that of the terminal's own base station.

Interference mitigation may be used to mitigate (e.g., to avoid or reduce) interference on a given link in order to improve performance of data transmission. Interference mitigation may blank or reduce transmit power of interfering stations so that a higher SINR can be achieved for a desired data transmission. Interfering stations may also beamsteer their transmissions away from a requesting station so that a higher SINR can be achieved. In the example above, transmitter stations A and X may transmit on different time and/or frequency resources so that station X no longer interferes with station A at station B. Alternatively or additionally, interfering station X may perform beamsteering and apply appropriate precoding weights for different transmit antennas at station X so that lower power (e.g., a spatial null) is directed toward station B, which would then observe less interference from station X. The terms "steering", "beamsteering", and "beamforming" are often used interchangeably. Interference mitigation may be achieved by contending for time and frequency resources through an exchange of messages between the various affected stations. Interference mitigation may be used for synchronous systems as well as asynchronous systems. For clarity, much of the description below is for a synchronous system.

Figure 2:
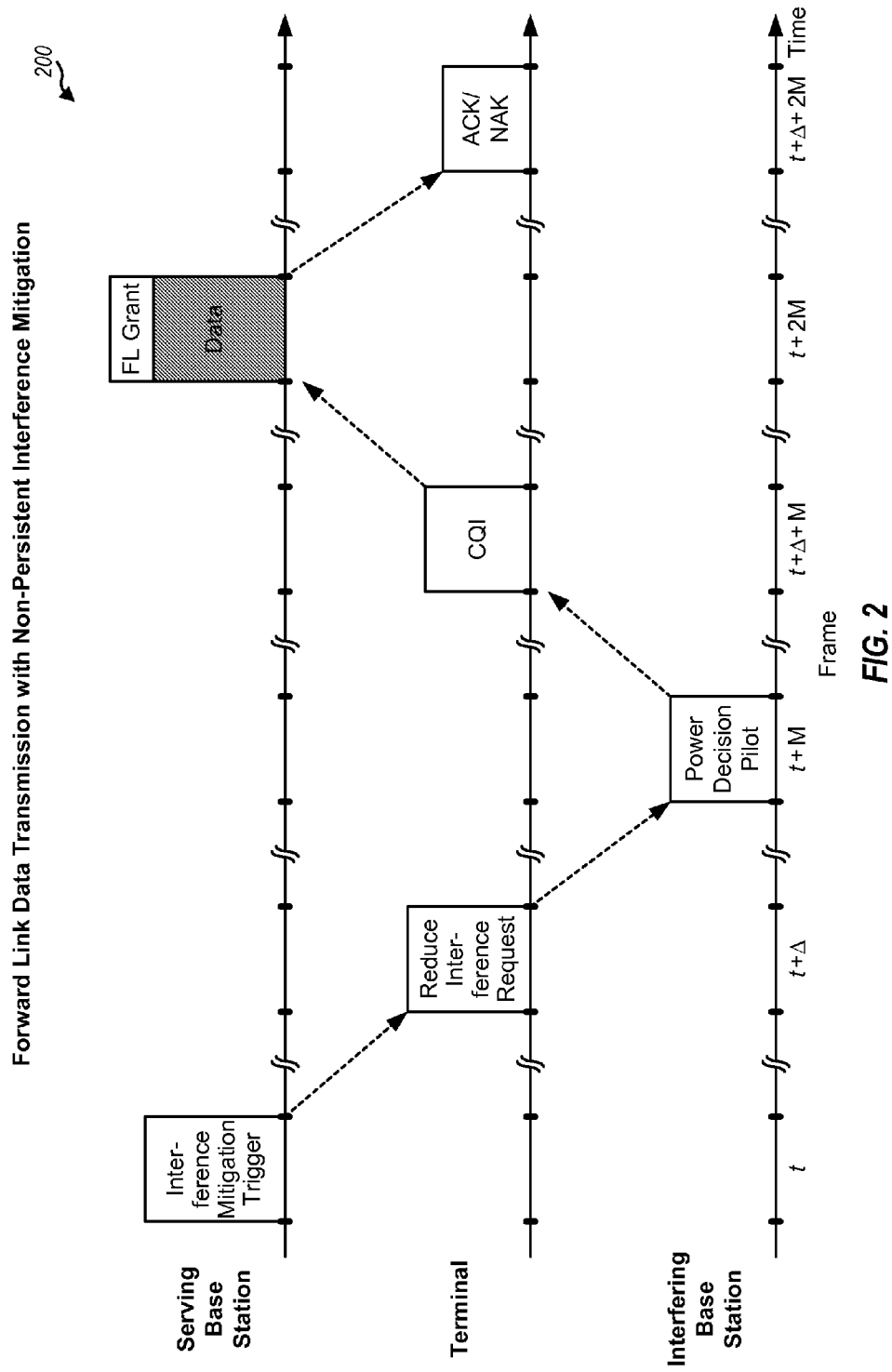
FIGS. 2 and 3 show forward link data transmission with non-persistent and persistent interference mitigation, respectively.

FIG. 2 shows a design of a forward link data transmission scheme 200 with non-persistent interference mitigation. A serving base station may have data to send to a terminal and may have knowledge that the terminal is observing high interference on the forward link. The serving base station may receive pilot reports from the terminal, and the pilot reports may indicate and/or identify strong interfering base stations. The serving base station may send an interference mitigation trigger to the terminal in frame t. The interference mitigation trigger may invoke the terminal to request interfering base stations to reduce interference on the forward link and may convey specific resources on which to reduce interference, a priority of the data to send, and/or other information. The priority may be determined based on the type of data to send (e.g., traffic data or control data), a quality of service (QoS) level, an accumulated buffer level, etc.

The terminal may receive the interference mitigation trigger in frame t and may send a reduce interference request in frame t+Δ. The reduce interference request may also be referred to as a contention message. The terminal may send the reduce interference request to (i) only base stations that are strong interferers to the terminal on the forward link or (ii) all neighbor base stations that can receive the request. The reduce interference request may ask the interfering base stations to reduce interference on specified resources and may also convey the priority of the data to send, the urgency of the request, and/or other information.

An interfering base station may receive the reduce interference request from the terminal and may grant or dismiss the request. If the request is granted, then the interfering base station may adjust its transmit power and/or steer its transmission in order to reduce interference to the terminal. In one design, the interfering base station may determine a transmit power level $P_d$ that it will use on the specified resources based on various factors such as its forward link buffer status, the priority of the data, the urgency of the request, etc. The interfering base station may transmit a power decision pilot in frame t+M at a power level $P_p$, which may be determined based on the power level $P_d$ that will be used on the specified resources in frame t+2M. $P_p$ may be equal to $P_d$ or may be a scaled version of $P_d$. In another design, the interfering base station may beamsteer away from the terminal.

The terminal may receive power decision pilots from all interfering base stations as well as a pilot from the serving base station. The terminal may estimate SINR of the specified resources based on the received pilots. The power decision pilots may allow the terminal to more accurately estimate SINR. The terminal may determine channel quality indicator (CQI) information, which may convey an SINR value, a data rate, and/or other information. The terminal may send the CQI information in frame t+Δ+M.

The serving base station may receive the CQI information from the terminal and may schedule the terminal for data transmission on assigned resources, which may include all or a subset of the specified resources. The serving base station may select a rate based on the CQI information and may process a data packet in accordance with the selected rate. The serving base station may generate a forward link (FL) grant, which may also be referred to as a resource assignment. The FL grant may include the assigned resources, the selected rate, and/or other information. The serving base station may send the FL grant and a packet transmission to the terminal in frame t+2M. The terminal may receive the FL grant and the packet transmission, decode the received transmission in accordance with the selected rate, and generate an acknowledgement (ACK) or a negative acknowledgement (NAK) based on the decoding result. The terminal may send the ACK or NAK in frame t+Δ+2M.

FIG. 2 shows the terminal transmitting on frames that are spaced apart by M frames. The frames used by the terminal may belong in one hybrid automatic retransmission (HARQ) interlace. The frames used by the serving and interfering base stations may have predetermined offsets from the frames used by the terminal.

The non-persistent interference mitigation scheme shown in FIG. 2 may allow the terminal to achieve higher SINR. One disadvantage of the scheme in FIG. 2 is that the messages to reduce interference may require a fair amount of resources. For the scheme in FIG. 2, each reduce interference request may cover one packet transmission. The message sequence in FIG. 2 may be repeated for each packet transmission. In this case, contending for resources for every packet transmission may result in high signaling overhead, which may reduce data rates for packet transmissions. Signaling overhead may be reduced by contending for a large set of resources. However, it may be more difficult to reserve a large set of resources. Furthermore, all of the reserved resources may not be utilized, which would then lead to waste and inefficiency. In addition, if contention is allowed only at relatively large time intervals, then latency would increase and may adversely impact performance.

In an aspect, a reduce interference request may be persistent and valid for a period of time, which may be referred to as a persistent time period. However, the responses from interfering stations do not need to be persistent and can change during the persistent time period. This design may reduce signaling overhead since the request can be sent just once for the entire persistent time period. This design may also improve resource utilization since an interfering station can either grant or deny the request for individual frames instead of the entire persistent time period.

Figure 3:
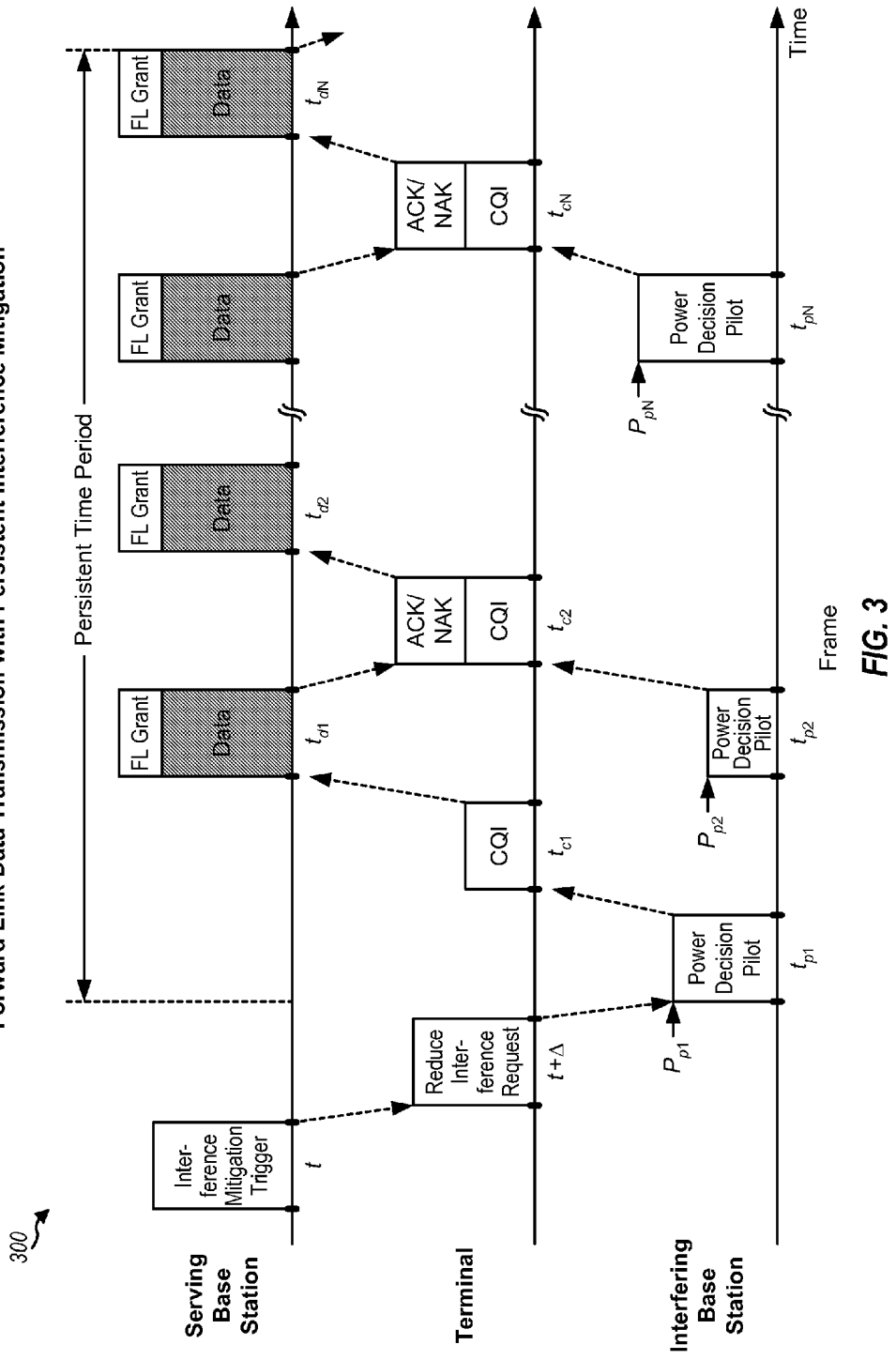

FIG. 3 shows a design of a forward link data transmission scheme 300 with persistent interference mitigation. A serving base station may have data to send to a terminal and may have knowledge that the terminal is observing high interference on the forward link. The serving base station may send an interference mitigation trigger to the terminal in frame t. The interference mitigation trigger may convey specific resources on which to reduce interference, the priority of the data to send, and/or other information.

The terminal may receive the interference mitigation trigger in frame t and may send a reduce interference request in frame t+Δ, e.g., to strong interfering base stations or all neighbor base stations. The reduce interference request may convey the priority of the data to send, the urgency of the request, the persistent time period over which the request is valid, and/or other information. In one design, the persistent time period covers N frames $t_{d1}$, through $t_{dN}$ that may be used for data transmission and are referred to as data frames. In one design, the N data frames may be spaced apart by M frames and may belong in one HARQ interlace. In another design, the persistent time period may be indefinite and may be terminated by a termination message. In general, the persistent time period may cover any number of data frames, the data frames may be contiguous or non-contiguous, and each data frame may be any frame within the persistent time period. The data frames may be explicitly or implicitly provided by the reduce interference request. The first data frame $t_{d1}$ may be offset by Q frames from the frame in which the reduce interference request is sent, where Q may be a fixed value (e.g., Q=4), a configurable value provided in the request, or a value conveyed in other manners.

An interfering base station may receive the reduce interference request from the terminal and may determine the persistent time period over which the request is valid. In one design, the N data frames $t_{d1}$ through $t_{dN}$ in the persistent time period may be associated with N pilot frames $t_{p1}$ through $t_{pN}$, respectively, in which power decision pilots may be sent. Each pilot frame $t_{pn}$ may be offset by a fixed number of frames from the corresponding data frame $t_{dn}$, where n ∈ {1, ..., N}. For example, the pilot frames may be on the same HARQ interlace as the data frames, and each pilot frame may be offset by M frames from the corresponding data frame. In general, the persistent time period may cover any number of pilot frames, and each pilot frame may be any frame within the persistent time period. For simplicity, the description below assumes N pilot frames corresponding to N data frames.

For each data frame $t_{dn}$ within the persistent time period, the interfering base station may grant or dismiss the request to reduce interference for that data frame. A decision to grant or dismiss the request may be based on various factors such as:

The data rate and QoS requirements of the terminal sending the reduce interference request, Whether reduce interference requests are received from other terminals, and The data rate and QoS requirements of the interfering base station.

If the request is granted, then the interfering base station may determine a transmit power level $P_{dn}$ that it will use on the specified resources in data frame $t_{dn}$. The interfering base station may then transmit a power decision pilot in the corresponding pilot frame $t_{pn}$ at a transmit power level $P_{pn}$, which may be determined based on $P_{dn}$.

For each pilot frame $t_{pn}$ within the persistent time period, the terminal may receive power decision pilots from all interfering base stations as well as a pilot from the serving base station. The terminal may estimate SINR of the specified resources based on the received pilots and may determine CQI information. The terminal may send the CQI information in control frame $t_{cn}$, which may be offset by a fixed number of frames from pilot frame $t_{pn}$.

For each data frame $t_{dn}$, the serving base station may receive the CQI information from the terminal in control frame $t_{cn}$ and may schedule the terminal for data transmission on assigned resources. The serving base station may generate and send an FL grant and a packet transmission to the terminal in data frame $t_{dn}$. The terminal may receive the FL grant and the packet transmission in data frame $t_{dn}$, decode the received transmission in accordance with a selected rate, and send an ACK or a NAK based on the decoding result. Up to N packet transmissions may be sent during the persistent time period, as shown in FIG. 3.

The various messages and transmissions in FIG. 3 may be sent as follows:

Interference mitigation trigger—sent once,

Reduce interference request—sent once,

Power decision pilot—sent once or multiple times during the persistent time period, CQI information—sent once or multiple times during the persistent time period, and Data—sent once or multiple times during the persistent time period.

In general, the interference mitigation trigger and the reduce interference request may be sent at any time to start interference mitigation. The request may be synchronous and sent a fixed number of frames after the trigger. The request may also be asynchronous and sent any number of frames after the trigger. The trigger and/or the request may be resent (e.g., with higher priority) if necessary. The trigger and/or the request may be sent over the air and/or via a backhaul. For a backhaul-based approach for data transmission on the forward link, the serving base station would not send an interference mitigation trigger to the terminal but may send a reduce interference request via the backhaul to neighbor base stations. The neighbor base stations may then send power decision pilots on the forward link. For a backhaul-based approach for data transmission on the reverse link, the serving base station may send a reduce interference request via the backhaul to neighbor base stations, which may then send the request to terminals within their coverage and/or make transmit power decisions for the terminals. These terminals may then send power decision pilots on the reverse link. Persistent interference mitigation may be more applicable when the trigger and/or the request is sent via the backhaul since the delay of the backhaul may be unknown and relatively long.

The power decision pilot, the CQI information, and the data may be synchronous and may be sent in pilot, control, and data frames, respectively, as shown in FIG. 3. There may be fixed offsets between these different types of frames, which may simplify operation at the base stations and terminals.

In general, the terminal may send a reduce interference request in any frame. Furthermore, the reduce interference request may be either (i) non-persistent and cover one data frame, e.g., as shown in FIG. 2, or (ii) persistent and cover multiple data frames, e.g., as shown in FIG. 3. The serving base station may send an interference mitigation trigger to invoke the terminal to send either a persistent or non-persistent reduce interference request.

The interfering base station may determine whether to grant or dismiss the reduce interference request for each data frame in the persistent time period. The interfering base station may decide to reduce its transmit power for some data frames but not others. The interfering base station may also reduce its transmit power by different amounts for different data frames. A decision on whether or not to reduce transmit power, how much to reduce transmit power, whether or not to beamsteer, etc., may be made on a per-frame basis and based on the factors described above.

The interfering base station may transmit a power decision pilot in frame $t_{pn}$ to convey the transmit power level $P_{dn}$ that it will use in corresponding data frame $t_{dn}$. Pilot frame $t_{pn}$ may be earlier than data frame $t_{dn}$ by a fixed number of frames, e.g., by four frames, in which case $t_{pn}=t_{dn}-4$. The transmit power level $P_{pn}$ for the power decision pilot may be equal to the transmit power level $P_{dn}$ for the data frame or may be a scaled version of $P_{dn}$. In the design shown in FIG. 3, the interfering base station sends a power decision pilot for each data frame. In general, the power decision pilot may be sent at any rate, which may be more or less frequently than the data frames. For example, a power decision pilot may be sent once every K data frames, where K may be a value greater than one.

The terminal may use the power decision pilots to determine CQI information and may send the CQI information to the serving base station. In the design shown in FIG. 3, the terminal sends CQI information for each data frame. In general, the terminal may or may not send CQI information for every data frame depending on various factors such as how often power decision pilots are transmitted, channel and interference conditions, etc. For example, if the channel and interference conditions do not change much from data frame to data frame, then the terminal may choose not to send CQI information. In this case, the serving base station may use the latest available CQI information for the terminal. If CQI is trigger-based, then the CQI information may be sent on contention-based resources that may be shared by multiple terminals.

The serving base station may schedule the terminal for data transmission based on the CQI information and/or other information. The serving base station may send an FL grant, which may be a persistent or non-persistent assignment. The terminal may be scheduled for each data frame in the persistent time period or for a subset of the N data frames.

Figure 4:
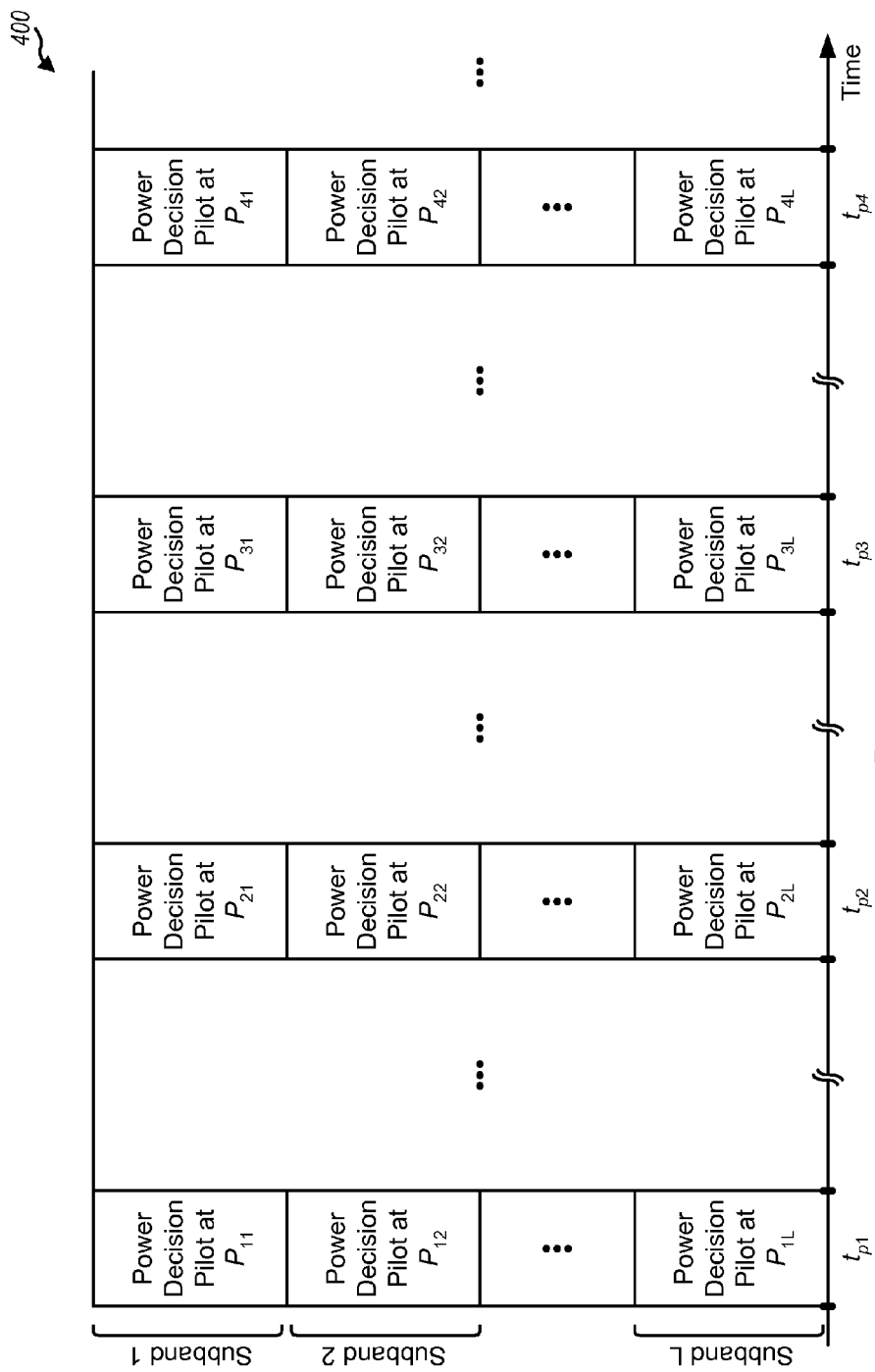
FIG. 4 shows a design of transmitting power decision pilots.

FIG. 4 shows a design of transmitting power decision pilots. In this design, the system bandwidth may be partitioned into L subbands 1 through L, where L may be any integer value. Each subband may include a set of contiguous or non-contiguous subcarriers, which may be obtained with orthogonal frequency division multiplexing (OFDM), single-carrier frequency division multiplexing (SC-FDM), etc.

A reduce interference request may convey one or more subbands on which to reduce interference. An interfering base station may identify all subbands on which reduced interference is requested, determine whether or not to reduce transmit power on each identified subband, and determine the transmit power level to use for each identified subband. The interfering base station may then transmit a power decision pilot on each subband at the transmit power level selected for that subband. Each terminal sending a reduce interference request may use the power decision pilot for each subband conveyed in the request.

The interfering base station may also convey the transmit power level that it will use in other manners. For example, the interfering base station may convey the transmit power level for each subband in a broadcast message.

The terminal may send a reduce interference request for transmission of traffic data/channels or control data/channels. The type of data to send (e.g., traffic or control) may be (i) implicitly conveyed by the priority of the data to send, e.g., with higher priority for control data and lower priority for traffic data, or (ii) explicitly conveyed by one or more bits in the request. A decision on whether to grant or dismiss the request may be dependent on whether the request is for traffic data or control data. The interfering base station may be more likely to grant a reduce interference request for control data than traffic data. The interfering base station may also be required to grant a reduce interference request for certain types of control data (e.g., for initial access) or for all types of control data. For example, the terminal may attempt to make an initial connection to its serving base station and may send a reduce interference request to ask all interfering base stations to reduce interference for a particular amount of time. All interfering base stations may be required to grant this request. In general, persistent interference mitigation may be used for only control data, or only traffic data, or both traffic and control data.

Data transmission with interference mitigation on the forward link has been described above. Data transmission with interference mitigation may also be used on the reverse link, as described below.

Figure 5:
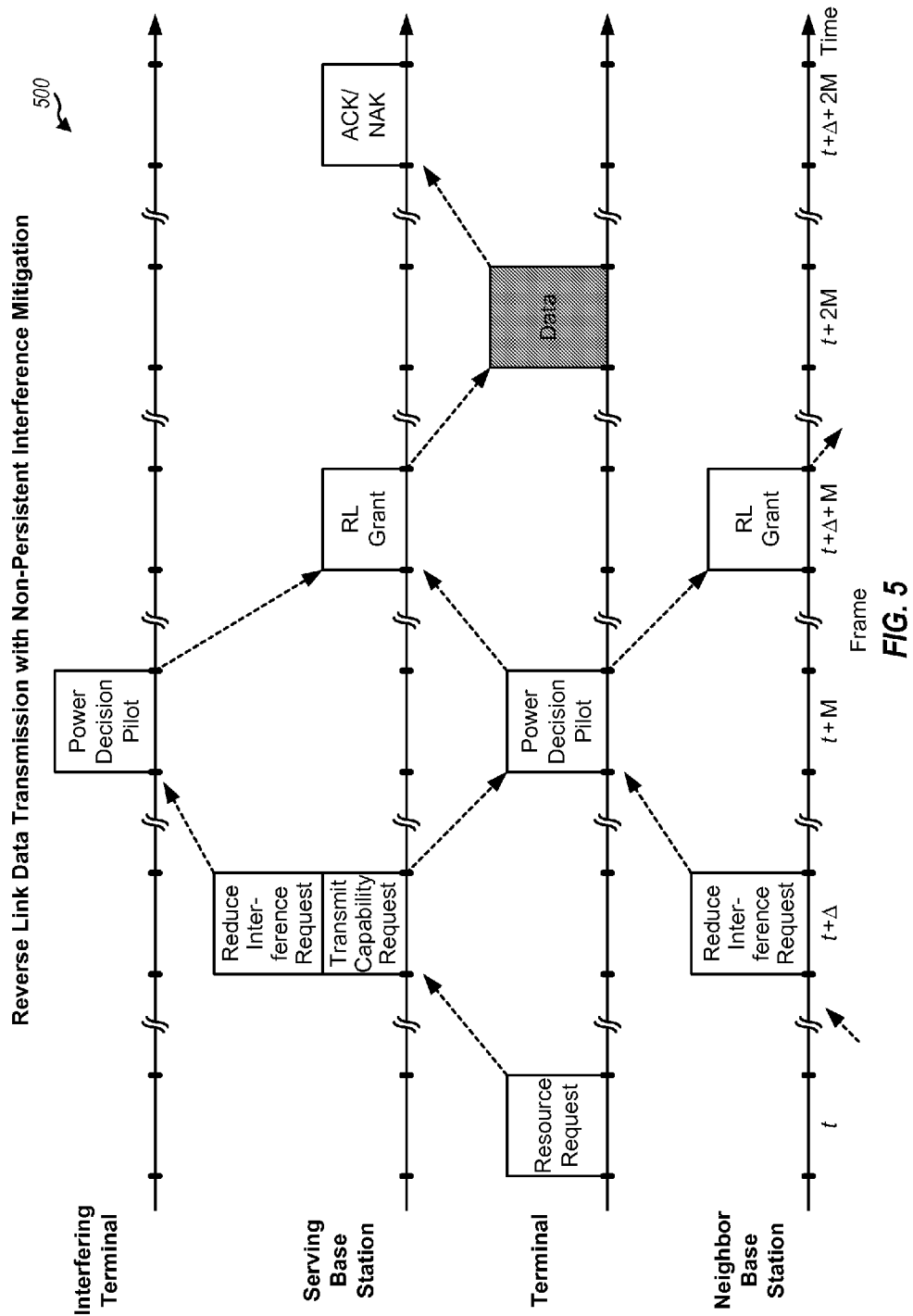
FIGS. 5 and 6 show reverse link data transmission with non-persistent and persistent interference mitigation, respectively.

FIG. 5 shows a design of a reverse link data transmission scheme 500 with non-persistent interference mitigation. A terminal may have data to send to a serving base station and may send a resource request in frame t. The resource request may indicate a buffer size at the terminal, the priority of the data to send, the urgency of the resource request, etc. The serving base station may receive the resource request in frame t and may send a transmit capability request to the terminal in frame t+Δ to ask for the transmit capability of the terminal. The serving base station may also send a reduce interference request in frame t+Δ to ask interfering terminals to reduce interference on specific resources.

The terminal may receive the transmit capability request from the serving base station and may also receive reduce interference requests from neighbor base stations. For simplicity, only one neighbor base station is shown in FIG. 5. The terminal may determine the transmit power level that it can use on the specified resources based on the reduce interference requests from the neighbor base stations. The terminal may convey this transmit power level via a power decision pilot that is sent in frame t+M.

The serving base station may receive the power decision pilots from the terminal as well as the interfering terminals and may estimate SINR of the specified resources based on the received pilots. The serving base station may select a rate for the terminal based on the estimated SINR. The serving base station may generate a reverse link (RL) grant, which may include the assigned resources, the selected rate, the transmit power level to use for the assigned resources, and/or other information. The serving base station may send the RL grant to the terminal in frame t+Δ+M. The terminal may receive the RL grant, process a packet in accordance with the selected rate, and send a packet transmission on the assigned resources in frame t+2M. The serving base station may receive the packet transmission from the terminal, decode the received transmission, and send an ACK or a NAK based on the decoding result.

FIG. 5 shows an example reverse link data transmission scheme with non-persistent interference mitigation. Interference mitigation on the reverse link may also be implemented in other manners. The transmission scheme in FIG. 5 may improve SINR for the terminal. However, some drawbacks of the transmission scheme include high signaling overhead.

Figure 6:
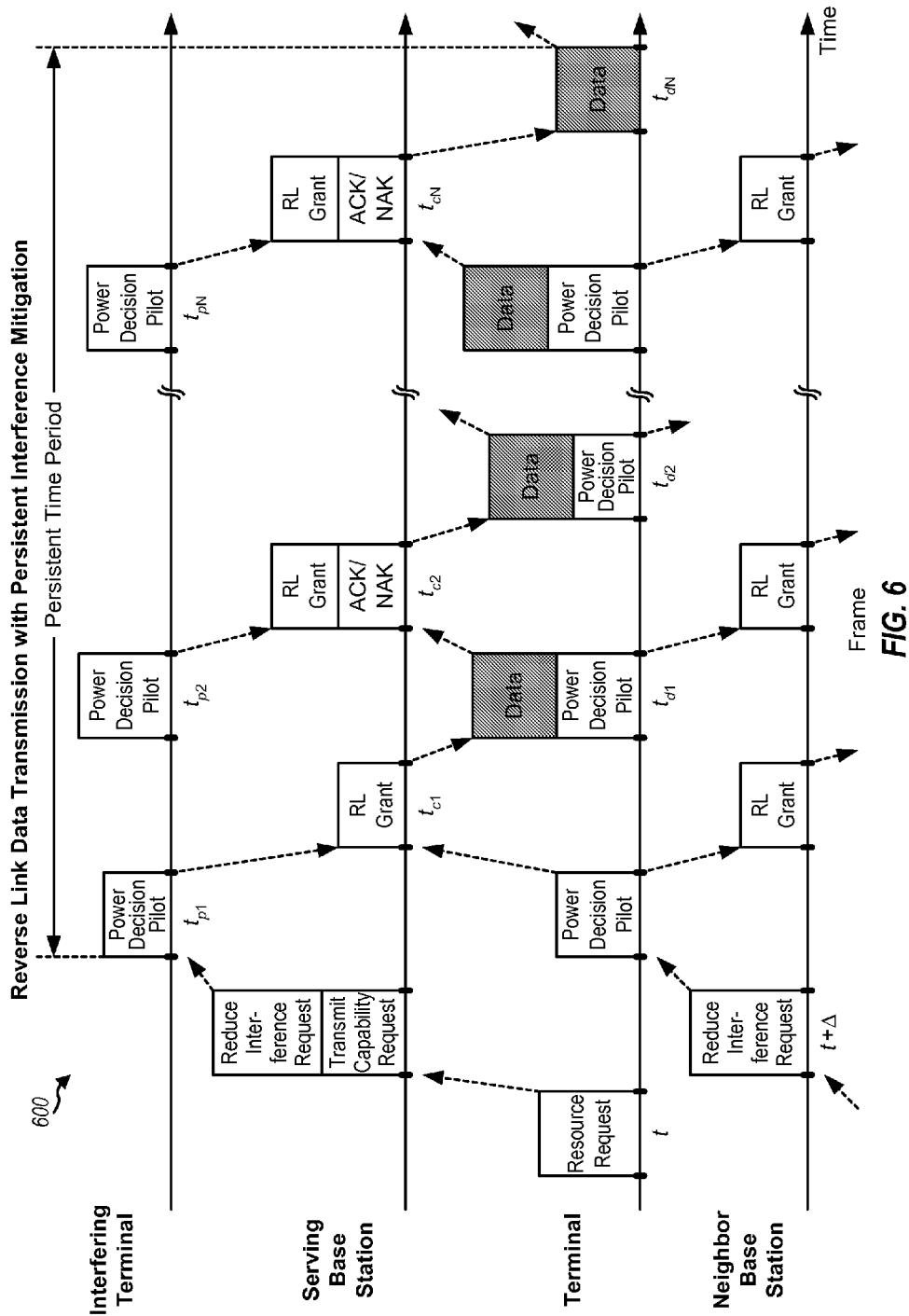

FIG. 6 shows a design of a reverse link data transmission scheme 600 with persistent interference mitigation. A terminal may have data to send to a serving base station and may send a resource request in frame t. The resource request may indicate a buffer size at the terminal, the priority of the data to send, the urgency of the resource request, etc. The serving base station may receive the resource request and may send a transmit capability request to the terminal in frame t+Δ. The serving base station may also send a reduce interference request to interfering terminals in frame t+Δ. The reduce interference request may convey the persistent time period over which the request is valid, the priority of the data to send, the urgency of the request, and/or other information. In one design, the persistent time period covers N data frames $t_{d1}$ through $t_{dN}$. The first data frame $t_{d1}$ may be offset by Q frames from the frame in which the reduce interference request is sent, where Q may be a fixed or configurable value.

The terminal may receive the transmit capability request from the serving base station and may also receive reduce interference requests from neighbor base stations. For simplicity, only one neighbor base station is shown in FIG. 6. The reduce interference requests from different neighbor base stations may be sent at different time and may cover different persistent time periods. The terminal may determine the persistent time period over which the request from each neighbor base station is valid. For each data frame $t_{dn}$ within the persistent time period, the terminal may grant or dismiss the request to reduce interference based on various factors such as the urgency of the request, whether requests have also been received from other base stations, the data requirements of the terminal, etc. If the request is granted, then the terminal may determine the transmit power level $P_{dn}$ that it will use in data frame $t_{dn}$. The terminal may then transmit a power decision pilot in corresponding pilot frame $t_{pn}$ at transmit power level $P_{pn}$, which may be determined based on $P_{dn}$.

An interfering terminal may receive the reduce interference request from the serving base station and may determine the persistent time period over which the request is valid. For each data frame $t_{dn}$ within the persistent time period, the interfering terminal may grant or dismiss the request to reduce interference based on the factors noted above. If the request is granted, then the interfering terminal may determine the transmit power level that it will use in the data frame. The interfering terminal may then transmit a power decision pilot in the corresponding pilot frame $t_{pn}$ based on the transmit power level that it will use in data frame $t_{dn}$.

The serving base station may receive the power decision pilots from the terminal as well as the interfering terminals in each pilot frame $t_{pn}$. The serving base station may estimate the SINR of the specified resources based on the received pilots and may select a rate for the terminal based on the estimated SINR. The serving base station may generate an RL grant, which may include the assigned resources, the selected rate, the transmit power level to use for the assigned resources, and/or other information. The serving base station may send the RL grant to the terminal in control frame $t_{cn}$. The terminal may receive the RL grant, process a packet in accordance with the selected rate, and send a packet transmission on the assigned resources in data frame $t_{dn}$. The serving base station may receive the packet transmission from the terminal, decode the received transmission, and send an ACK or a NAK based on the decoding result.

The various messages and transmissions in FIG. 6 may be sent as follows:

Resource request—sent once,
Transmit capability request—sent once,
Reduce interference request—sent once,
Power decision pilot—sent once or multiple times during the persistent time period,
RL grant—sent once or multiple times during the persistent time period, and
Data—sent once or multiple times during the persistent time period.

The resource request, the transmit capability request, and the reduce interference request may be sent at any time. The power decision pilot, the RL grant, and the data may be synchronous and may be sent in pilot, control, and data frames, respectively. There may be predetermined offsets between these different types of frames.

In the design shown in FIG. 6, the interfering terminal sends a power decision pilot for each data frame. In general, the power decision pilot may be sent at any rate, which may be more or less frequently than the data frames. The serving base station may also send an RL grant for each data frame (as shown in FIG. 6) or less frequently, e.g., whenever power decision pilots are received, whenever the channel and interference conditions change, etc.

As shown in FIG. 6, a given terminal may determine whether to grant or dismiss a reduce interference request for each data frame in the persistent time period. The terminal may decide to reduce its transmit power for some data frames but not others. The terminal may also reduce its transmit power by different amounts for different data frames. A decision on whether or not to reduce transmit power and how much to reduce transmit power may be made on a per-frame basis and may be dependent on the factors noted above.

For simplicity, FIGS. 2 through 6 show operation in a synchronous system in which the base stations and terminals have common timing, which may be provided by a common time source such as Global Positioning Satellite (GPS). Persistent interference mitigation may also be used for an asynchronous system in which the base stations may have different timing and their frames may not be time aligned. Terminals served by a given base station may have the same timing, and terminals served by different base stations may have different timing. Multiple terminals may asynchronously send reduce interference requests, and a base station may send a power decision pilot after receiving the later request. A power decision pilot may be sent continuously on few subcarriers and may convey the transmit power to be used a predetermined number of frames in the future. A station may obtain a coarse interference estimate based on power decision pilots from interfering stations. The interference level at the station may vary across frames and also within a given frame due to the asynchronous nature of the power decision pilots.

FIG. 7 shows a design of a process 700 for sending a reduce interference request in a wireless communication system. Process 700 may be performed by a station, which may be a base station or a terminal.

The station may send a request to reduce interference to at least one interfering station, with the request being valid for a time period covering multiple response periods (block 712). Each response period corresponds to a time period in which the request can be granted or dismissed. In one design, the multiple response periods may correspond to multiple frames usable for data transmission, e.g., one response period for each frame. The multiple frames may be contiguous or non-contiguous (e.g., spaced apart by a predetermined number of frames). The request may indicate the time period covered by the request, the priority of the request, the amount of data to send, the type of data to send, etc. Each interfering station may be able to grant or dismiss the request in each response period. Each interfering station may dismiss the request by transmitting at full power and may grant the request by transmitting at lower than full power and/or a different beam direction.

The station may receive a response from each interfering station indicating grant or dismissal of the request by that interfering station in each response period (block 714). In one design, the station may receive at least one pilot from each interfering station during the time period. Each pilot may be transmitted at a power level and/or a beam direction determined based on the grant or dismissal of the request by the interfering station for at least one response period. For example, the station may receive a pilot from each interfering station in each response period. The pilot for each response period may be transmitted a predetermined amount of time (e.g., a predetermined number of frames) earlier and at a first power level determined based on a second power level to be used by the interfering station for the response period. The station may also receive other transmissions for the response from each interfering station.

The station may estimate SINR at the station based on the response received from each interfering station (block 716). The SINR may be more accurate due to interference mitigation. The station may exchange (e.g., send or receive) data with another station based on the estimated SINR (block 718).

The station may determine whether to invoke interference mitigation with persistence or without persistence, e.g., based on the amount of data to send, the priority of the data, etc. The station may send the request to reduce interference for (i) multiple response periods if interference mitigation with persistence is to be invoked or (ii) a single response period if interference mitigation without persistence is to be invoked. The duration of the request may be provided in the request. Alternatively, the request may be valid until terminated, and the station may then send an indication to terminate the request at an appropriate time.

FIG. 8 shows a design of an apparatus 800 for sending a reduce interference request in a wireless communication system. Apparatus 800 includes a module 812 to send a request to reduce interference to at least one interfering station, with the request being valid for a time period covering multiple response periods, and each interfering station being able to grant or dismiss the request in each response period, a module 814 to receive from each interfering station a response indicating grant or dismissal of the request by the interfering station in each response period, a module 816 to estimate SINR at the station based on the response received from each interfering station, and a module 818 to exchange data with another station based on the estimated SINR.

Figures 9, 10:
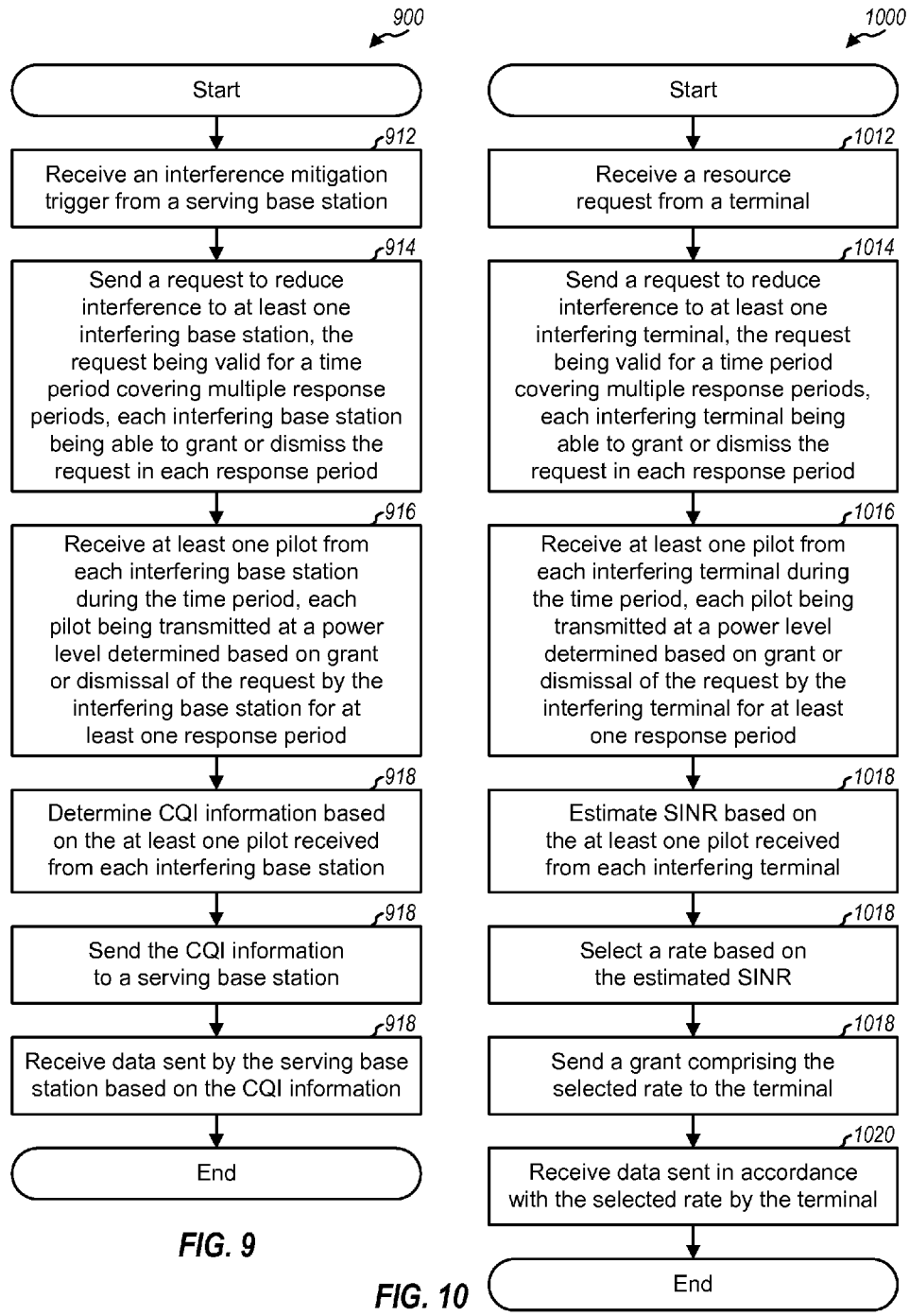
FIGS. 9 and 10 show processes for sending a reduce interference request by a terminal and a serving base station, respectively.

FIG. 9 shows a design of a process 900 for sending a reduce interference request by a terminal in a wireless communication system. Process 900 is one design of process 700 in FIG. 7.

The terminal may receive an interference mitigation trigger from a serving base station (block 912). The terminal may send a request to reduce interference to at least one interfering base station, with the request being valid for a time period covering multiple response periods (block 914). Each interfering base station may be able to grant or dismiss the request in each response period. The terminal may receive at least one pilot from each interfering base station during the time period (block 916). Each pilot may be transmitted at a power level and/or a beam direction determined based on the grant or dismissal of the request by the interfering base station for at least one response period.

The terminal may determine CQI information based on the at least one pilot received from each interfering base station (block 918). The terminal may send the CQI information to the serving base station (block 920). The terminal may receive data sent by the serving base station based on the CQI information (block 922).

FIG. 10 shows a design of a process 1000 for sending a reduce interference request by a serving base station in a wireless communication system. Process 1000 is another design of process 700 in FIG. 7.

The serving base station may receive a resource request from a terminal (block 1012). The serving base station may send a request to reduce interference to at least one interfering terminal, with the request being valid for a time period covering multiple response periods (block 1014). Each interfering terminal may be able to grant or dismiss the request in each response period. The serving base station may receive at least one pilot from each interfering terminal during the time period (block 1016). Each pilot may be transmitted at a power level and/or a beam direction determined based on the grant or dismissal of the request by the interfering terminal for at least one response period.

The serving base station may estimate SINR based on the at least one pilot received from each interfering terminal (block 1018). The serving base station may select a rate based on the estimated SINR (block 1020) and may send a grant comprising the selected rate to the terminal (block 1022). The serving base station may receive data sent in accordance with the selected rate by the terminal (block 1024).

FIG. 11 shows a design of a process 1100 for receiving a reduce interference request in a wireless communication system. Process 1100 may be performed by an interfering station, which may be a base station or a terminal.

The interfering station may receive a request to reduce interference from a requesting station, with the request being valid for a time period covering multiple response periods (block 1112). The interfering station may determine whether to grant or dismiss the request in each response period, e.g., based on the priority and/or type of data being sent for the requesting station, whether requests to reduce interference are received from other stations, the amount of data to send by the interfering station, etc. (block 1114). In one design, the interfering station may grant the request if control data is being sent and may either grant or dismiss the request based on one or more parameters if traffic data is being sent.

The interfering station may send to the requesting station a response indicating grant or dismissal of the request in each response period (block 1116). In one design, the interfering station may transmit at least one pilot during the time period, with each pilot being transmitted at a power level and/or a beam direction determined based on the grant or dismissal of the request for at least one response period. For example, each pilot may be transmitted (i) at full power if the request is dismissed or (ii) at lower than full power and/or a different beam direction if the request is granted. The interfering station may transmit multiple pilots on multiple subbands in a first frame within the time period. Each pilot may be transmitted on one subband at a first power level determined based on a second power level to be used for data sent on that subband in a second frame after the first frame, e.g., as shown in FIG. 4. The interfering station may also send the response in other manners.

FIG. 12 shows a design of an apparatus 1200 for receiving a reduce interference request in a wireless communication system. Apparatus 1200 includes a module 1212 to receive a request to reduce interference from a requesting station, with the request being valid for a time period covering multiple response periods, a module 1214 to determine whether to grant or dismiss the request in each response period, and a module 1216 to send to the requesting station a response indicating grant or dismissal of the request in each response period.

The modules in FIGS. 8 and 12 may comprise processors, electronics devices, hardware devices, electronics components, logical circuits, memories, etc., or any combination thereof.

Figure 13:
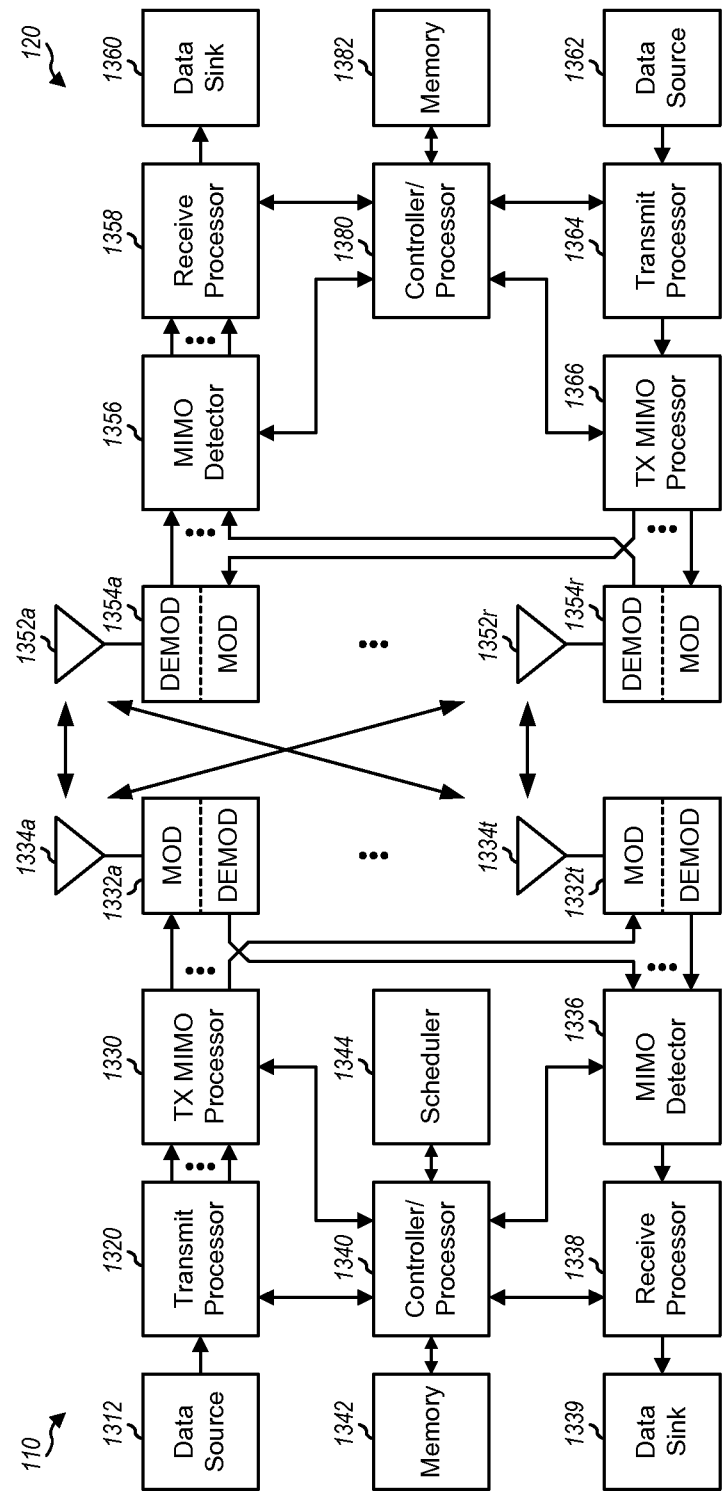
FIG. 13 shows a block diagram of a base station and a terminal.

FIG. 13 shows a block diagram of a design of a base station 110 and a terminal 120, which may be one of the base stations and one of the terminals in FIG. 1. In this design, base station 110 is equipped with T antennas 1334a through 1334t, and terminal 120 is equipped with R antennas 1352a through 1352r, where in general T≥1 and R≥1.

At base station 110, a transmit processor 1320 may receive traffic data from a data source 1312 and messages from a controller/processor 1340. For example, controller/processor 1340 may provide resource grants as well as messages for interference mitigation shown in FIGS. 2 through 6. Transmit processor 1320 may process (e.g., encode, interleave, and symbol map) the traffic data, messages, and pilot and provide data symbols, control symbols, and pilot symbols, respectively. A transmit (TX) multiple-input multiple-output (MIMO) processor 1330 may perform spatial processing (e.g., preceding) on the data symbols, the control symbols, and/or the pilot symbols, if applicable, and may provide T output symbol streams to T modulators (MODs) 1332a through 1332t. Each modulator 1332 may process a respective output symbol stream (e.g., for OFDM, SC-FDM, etc.) to obtain an output sample stream. Each modulator 1332 may further process (e.g., convert to analog, amplify, filter, and upconvert) the output sample stream to obtain a forward link signal. T forward link signals from modulators 1332a through 1332t may be transmitted via T antennas 1334a through 1334t, respectively.

At terminal 120, antennas 1352a through 1352r may receive the forward link signals from base station 110 and may provide received signals to demodulators (DEMODs) 1354a through 1354r, respectively. Each demodulator 1354 may condition (e.g., filter, amplify, downconvert, and digitize) a respective received signal to obtain received samples. Each demodulator 1354 may further process the received samples (e.g., for OFDM, SC-FDM, etc.) to obtain received symbols. A MIMO detector 1356 may obtain received symbols from all R demodulators 1354a through 1354r, perform MIMO detection on the received symbols if applicable, and provide detected symbols. A receive processor 1358 may process (e.g., demodulate, deinterleave, and decode) the detected symbols, provide decoded traffic data for terminal 120 to a data sink 1360, and provide decoded messages to a controller/processor 1380.

On the reverse link, at terminal 120, a transmit processor 1364 may receive and process traffic data from a data source 1362 and messages (e.g., for resource requests and interference mitigation) from controller/processor 1380. The symbols from transmit processor 1364 may be precoded by a TX MIMO processor 1366 if applicable, further processed by modulators 1354a through 1354r, and transmitted to base station 110. At base station 110, the reverse link signals from terminal 120 may be received by antennas 1334, processed by demodulators 1332, detected by a MIMO detector 1336 if applicable, and further processed by a receive processor 1338 to obtain the decoded packets and messages transmitted by terminal 120.

Controllers/processors 1340 and 1380 may direct the operation at base station 110 and terminal 120, respectively. Controller/processor 1340 at base station 110 may perform or direct process 700 in FIG. 7, process 1000 in FIG. 10, process 1100 in FIG. 11, and/or other processes for the techniques described herein. Controller/processor 1380 at terminal 120 may perform or direct process 700 in FIG. 7, process 900 in FIG. 9, process 1100 in FIG. 11, and/or other processes for the techniques described herein. Memories 1342 and 1382 may store data and program codes for base station 110 and terminal 120, respectively. A scheduler 1344 may schedule terminals for data transmission on the forward and/or reverse links and may provide resource grants for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   sending a request to reduce interference to one or more interfering stations, the request being valid for a persistent time period covering multiple response periods, each interfering station granting or dismissing the request in each response period covered by the persistent time period, and each response period covering a data frame; and
   receiving from at least one of the one or more interfering stations a response indicating grant of the request in at least one response period covered by the persistent time period and a response indicating dismissal of the request in at least one other response period covered by the persistent time period.

2. The method of claim 1, further comprising:
generating the request to include at least one of duration of the persistent time period to reduce interference, priority of the request, amount of data to send, and type of data to send.

3. The method of claim 1, further comprising:
determining whether to invoke interference mitigation with persistence or without persistence;
sending the request to reduce interference for multiple response periods if interference mitigation with persistence is to be invoked; and
sending the request to reduce interference for a single response period if interference mitigation without persistence is to be invoked.

4. The method of claim 1, wherein the request to reduce interference is valid until terminated, the method further comprising:
sending to the one or more interfering stations an indication to terminate the request to reduce interference.

5. The method of claim 1, wherein each interfering station dismisses the request by transmitting at full power and grants the request by transmitting at lower than full power.

6. The method of claim 1, wherein an interfering station grants the request by beamsteering away from a station sending the request.

7. The method of claim 1, further comprising:
receiving from each interfering station a response indicating grant or dismissal of the request by the interfering station in each response period.

8. The method of claim 1, further comprising:
receiving at least one pilot from each interfering station during the persistent time period, each pilot being transmitted at a power level or a beam direction determined based on grant or dismissal of the request by the interfering station for at least one response period.

9. The method of claim 1, further comprising:
receiving a pilot from each interfering station in each response period, the pilot for each response period being transmitted a predetermined amount of time earlier and at a first power level determined based on a second power level to be used by the interfering station in the response period.

10. The method of claim 1, further comprising:
estimating signal-to-noise-and-interference ratio (SINR) at a first station based on at least one pilot received from each interfering station; and
exchanging data with a second station based on the estimated SINR.

11. The method of claim 1, wherein the one or more interfering stations comprises one or more interfering base stations, and wherein the request to reduce interference is sent via a backhaul to the one or more interfering base stations to request each interfering base station to reduce interference for data transmission on forward link.

12. The method of claim 1, wherein the one or more interfering stations comprises one or more interfering terminals, and wherein the request to reduce interference is sent via a backhaul to one or more base stations to send to the one or more interfering terminals to request each interfering terminal to reduce interference for data transmission on reverse link.

13. An apparatus for wireless communication, comprising:
at least one processor configured to:
send a request to reduce interference to one or more interfering stations, the request being valid for a persistent time period covering multiple response periods, each interfering station granting or dismissing the request in each response period covered by the persistent time period, and each response period covering a data frame; and
receive from at least one of the one or more interfering stations a response indicating grant of the request in at least one response period covered by the persistent time period and a response indicating dismissal of the request in at least one other response period covered by the persistent time period.

14. The apparatus of claim 13, wherein the at least one processor is configured to receive from each interfering station a response indicating grant or dismissal of the request by the interfering station in each response period.

15. The apparatus of claim 13, wherein the at least one processor is configured to receive at least one pilot from each interfering station during the persistent time period, each pilot being transmitted at a power level or a beam direction determined based on grant or dismissal of the request by the interfering station for at least one response period.

16. The apparatus of claim 13, wherein the at least one processor is configured to estimate signal-to-noise-and-interference ratio (SINR) at a first station based on at least one pilot received from each interfering station, and to exchanging data with a second station based on the estimated SINR.

17. An apparatus for wireless communication, comprising:
means for sending a request to reduce interference to one or more interfering stations, the request being valid for a persistent time period covering multiple response periods, each interfering station granting or dismissing the request in each response period covered by the persistent time period, and each response period covering a data frame; and
means for receiving from at least one of the one or more interfering stations a response indicating grant of the request in at least one response period covered by the persistent time period and a response indicating dismissal of the request in at least one other response period covered by the persistent time period.

18. The apparatus of claim 17, further comprising:
means for receiving from each interfering station a response indicating grant or dismissal of the request by the interfering station in each response period.

19. The apparatus of claim 17, further comprising:
means for receiving at least one pilot from each interfering station during the persistent time period, each pilot being transmitted at a power level or a beam direction determined based on grant or dismissal of the request by the interfering station for at least one response period.

20. The apparatus of claim 17, further comprising:
means for estimating signal-to-noise-and-interference ratio (SINR) at a first station based on at least one pilot received from each interfering station; and
means for exchanging data with a second station based on the estimated SINR.

21. A non-transitory computer-readable medium comprising:
code for causing at least one computer to send a request to reduce interference to one or more interfering stations, the request being valid for a persistent time period covering multiple response periods, each interfering station granting or dismissing the request in each response period covered by the persistent time period, and each response period covering a data frame; and
code for causing at the least one computer to receive from at least one of the one or more interfering stations a response indicating grant of the request in at least one response period covered by the persistent time period and a response indicating dismissal of the request in at least one other response period covered by the persistent time period.

22. The non-transitory computer-readable medium of claim 21, further comprising:
code for causing the one computer to receive from each interfering station a response indicating grant or dismissal of the request by the interfering station in each response period.

23. A method for wireless communication, comprising:
sending a request to reduce interference to one or more interfering base stations, the request being valid for a persistent time period covering multiple response periods, each interfering base station granting or dismissing the request in each response period covered by the persistent time period, and each response period covering a data frame; and
receiving from at least one of the one or more interfering base stations a response indicating grant of the request in at least one response period covered by the persistent time period and a response indicating dismissal of the request in at least one other response period covered by the persistent time period.

24. The method of claim 23, further comprising:
receiving an interference mitigation trigger from a serving base station, and wherein the request to reduce interference is sent in response to receiving the interference mitigation trigger.

25. The method of claim 23, further comprising:
receiving at least one pilot from each interfering base station during the persistent time period, each pilot being transmitted at a power level or a beam direction determined based on grant or dismissal of the request by the interfering base station for at least one response period.

26. The method of claim 23, further comprising:
determining channel quality indicator (CQI) information based on at least one pilot received from each interfering base station;
sending the CQI information to a serving base station; and
receiving data sent by the serving base station based on the CQI information.

27. An apparatus for wireless communication, comprising:
at least one processor configured to:
send a request to reduce interference to one or more interfering base stations, the request being valid for a persistent time period covering multiple response periods, each interfering base station granting or dismissing the request in each response period covered by the persistent time period, and each response period covering a data frame; and
receive from at least one of the one or more interfering base stations a response indicating grant of the request in at least one response period covered by the persistent time period and a response indicating dismissal of the request in at least one other response period covered by the persistent time period.

28. The apparatus of claim 27, wherein the at least one processor is configured to receive an interference mitigation trigger from a serving base station and to send the request to reduce interference in response to receiving the interference mitigation trigger.

29. The apparatus of claim 27, wherein the at least one processor is configured to receive at least one pilot from each interfering base station during the persistent time period, each pilot being transmitted at a power level or a beam direction determined based on grant or dismissal of the request by the interfering base station for at least one response period.

30. The apparatus of claim 27, wherein the at least one processor is configured to determine channel quality indicator (CQI) information based on at least one pilot received from each interfering base station, to send the CQI information to a serving base station, and to receive data sent by the serving base station based on the CQI information.

31. A method for wireless communication, comprising:
sending a request to reduce interference to one or more interfering terminals, the request being valid for a persistent time period covering multiple response periods, each interfering terminal granting or dismissing the request in each response period covered by the persistent time period, and each response period covering a data frame; and
receiving from at least one of the one or more interfering terminals a response indicating grant of the request in at least one response period covered by the persistent time period and a response indicating dismissal of the request in at least one other response period covered by the persistent time period.

32. The method of claim 31, further comprising:
receiving a resource request from a terminal, and wherein the request to reduce interference is sent in response to receiving the resource request.

33. The method of claim 31, further comprising:
receiving at least one pilot from each interfering terminal during the persistent time period, each pilot being transmitted at a power level or a beam direction determined based on grant or dismissal of the request by the interfering terminal for at least one response period.

34. The method of claim 31, further comprising:
estimating signal-to-noise-and-interference ratio (SINR) based on at least one pilot received from each interfering terminal;
selecting a rate based on the estimated SINR;
sending a grant comprising the selected rate to a terminal; and
receiving data sent in accordance with the selected rate by the terminal.

35. An apparatus for wireless communication, comprising:
at least one processor configured to:
send a request to reduce interference to one or more interfering terminals, the request being valid for a persistent time period covering multiple response periods, each interfering terminal granting or dismissing the request in each response period covered by the persistent time period, and each response period covering a data frame; and
receive from at least one of the one or more interfering terminals a response indicating grant of the request in at least one response period covered by the persistent time period and a response indicating dismissal of the request in at least one other response period covered by the persistent time period.

36. The apparatus of claim 35, wherein the at least one processor is configured to receive a resource request from a terminal and to send the request to reduce interference in response to receiving the resource request.

37. The apparatus of claim 35, wherein the at least one processor is configured to receive at least one pilot from each interfering terminal during the persistent time period, each pilot being transmitted at a power level or a beam direction determined based on grant or dismissal of the request by the interfering terminal for at least on response period.

38. The apparatus of claim 35, wherein the at least one processor is configured to estimate signal-to-noise-and-interference ratio (SINR) based on at least one pilot received from each interfering terminal, to select a rate based on the estimated SINR, to send a grant comprising the selected rate to a terminal, and to receive data sent in accordance with the selected rate by the terminal.

39. The method of claim 1, wherein the one or more interfering stations comprise a femto cell base station.

40. The method of claim 1, wherein the request to reduce interference is sent from a femto cell base station.

\* \* \* \* \*